United States Patent
Nergaard et al.

(10) Patent No.: US 8,810,198 B2
(45) Date of Patent: Aug. 19, 2014

(54) MULTIPORT VEHICLE DC CHARGING SYSTEM WITH VARIABLE POWER DISTRIBUTION ACCORDING TO POWER DISTRIBUTION RULES

(75) Inventors: Troy Adam Nergaard, San Francisco, CA (US); Martin Sukup, San Francisco, CA (US); Kristoffer John Donhowe, Sunnyvale, CA (US); Christopher Hugo Van Dyke, San Francisco, CA (US); Warwick Ka Kui Wong, Palo Alto, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 354 days.

(21) Appl. No.: 13/224,368

(22) Filed: Sep. 2, 2011

(65) Prior Publication Data

US 2013/0057209 A1    Mar. 7, 2013

(51) Int. Cl.
*H01M 10/46*   (2006.01)
(52) U.S. Cl.
USPC ........................................... 320/109; 320/138
(58) Field of Classification Search
USPC .................. 320/104, 107, 109, 132, 149, 138
See application file for complete search history.

(56) References Cited

U.S. PATENT DOCUMENTS

| 8,085,034 | B2 | 12/2011 | Sirton |
| 8,106,632 | B2 | 1/2012 | Delaille et al. |
| 2009/0072788 | A1 | 3/2009 | Delaille et al. |
| 2010/0114798 | A1 | 5/2010 | Sirton |
| 2010/0134067 | A1* | 6/2010 | Baxter et al. ............... 320/109 |
| 2011/0031929 | A1 | 2/2011 | Asada et al. |
| 2011/0144823 | A1* | 6/2011 | Muller et al. ............... 700/297 |
| 2011/0291616 | A1 | 12/2011 | Kim et al. |

FOREIGN PATENT DOCUMENTS

KR    10-1009485  B1    1/2011

OTHER PUBLICATIONS

International Application No. PCT/US2012/000271, International Search Report dated Dec. 14, 2012, 2 pages.

* cited by examiner

*Primary Examiner* — Edward Tso
(74) *Attorney, Agent, or Firm* — J. Richard Soderberg (57) ABSTRACT

A battery charging station is provided that includes a plurality of charge ports, a plurality of power stages where each power stage includes an AC to DC converter and where each power stage provides a portion of the charging station's maximum available charging power, a switching system that is used to couple the output of the power stages to the charging ports, a system monitor that determines current charging station and vehicle conditions, and a controller that controls operation of the switching system in accordance with a predefined set of power distribution rules and on the basis of the current charging station and vehicle conditions. Current charging station and vehicle conditions may include vehicle arrival time, usage fees, vehicle and/or customer priority information, battery pack SOC, and/or intended departure time.

23 Claims, 9 Drawing Sheets

MULTIPORT VEHICLE DC CHARGING SYSTEM WITH VARIABLE POWER DISTRIBUTION ACCORDING TO POWER DISTRIBUTION RULES

FIELD OF THE INVENTION

The present invention relates generally to battery charging systems and, more particularly, to a method and apparatus for distributing electrical power to recharge one or more electric and hybrid vehicles from a single source.

BACKGROUND OF THE INVENTION

A large percentage of the world's vehicles run on gasoline using an internal combustion engine. The use of such vehicles, more specifically the use of vehicles which rely on fossil fuels, e.g., gasoline, creates two problems. First, due to the finite size and limited regional availability of such fuels, major price fluctuations and a generally upward pricing trend in the cost of gasoline are common, both of which can have a dramatic impact at the consumer level. Second, fossil fuel combustion is one of the primary sources of carbon dioxide, a greenhouse gas, and thus one of the leading contributors to global warming. Accordingly, considerable effort has been spent on finding alternative drive systems for use in both personal and commercial vehicles.

Electric vehicles, due to their cleaner and more efficient drive systems, offer one of the most promising alternatives to vehicles that use internal combustion drive trains. To be successful, however, an electric vehicle must meet consumers' expectations relative to performance, range, reliability, lifetime and cost. These expectations, in turn, place considerable importance on the design, configuration and implementation of the electric vehicle's rechargeable batteries. Clearly a critical aspect of the rechargeable batteries, especially from a consumer's point of view, is the ease and dependability by which the batteries may be recharged, either at home, work or at a public charging station.

Often when discussing the transition between a society dependent upon combustion vehicles and one that relies heavily on electric vehicles, the discussion turns to the need for a charging infrastructure that would make it easy for the electric vehicle owner to charge their vehicle when they are away from their primary charging station (e.g., home charging station). Unfortunately, the current charging infrastructure is quite limited. For example, in a large parking lot or structure, at best there may be one or two parking stalls that provide access to a charging system for recharging an electric vehicle's batteries. While this situation may be adequate for the current number of electric vehicles, as electric vehicles gain wider acceptance the need for better charging station access will become more essential.

Figure 1:
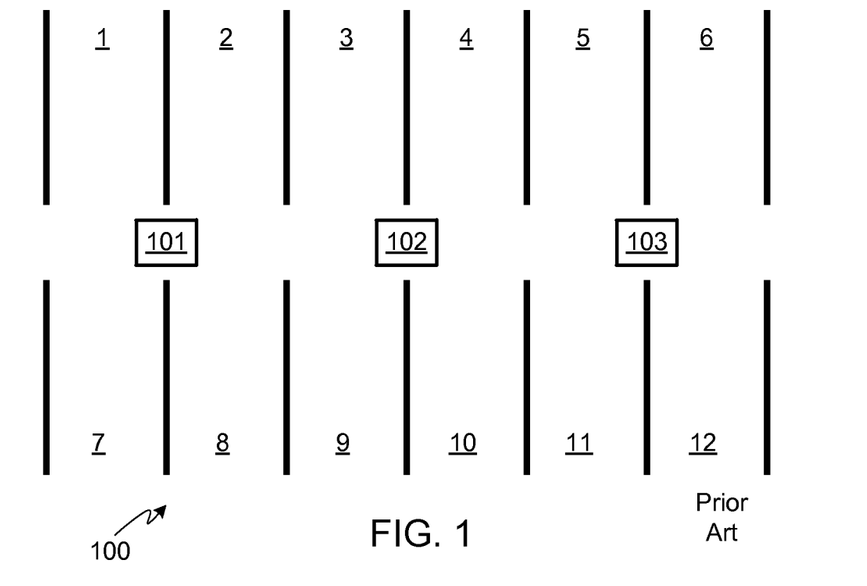
FIG. 1 provides an illustration of a portion of a parking lot utilizing centrally locating charging stations in accordance with the prior art.

FIG. 1 illustrates one method that is intended to increase charging station accessibility in a large parking lot. In this approach, charging stations are located throughout the parking lot such that each charging station is within reach of multiple parking stalls. For example, in the illustrated portion of parking lot 100, three charging stations 101-103 are spread throughout the twelve illustrated parking stalls, thereby allowing each charging station to be in range of four different stalls, i.e., charging station 101 is within range of stalls 1, 2, 7 and 8; charging station 102 is within range of stalls 3, 4, 9 and 10; and charging station 103 is within range of stalls 5, 6, 11 and 12.

Figure 2:
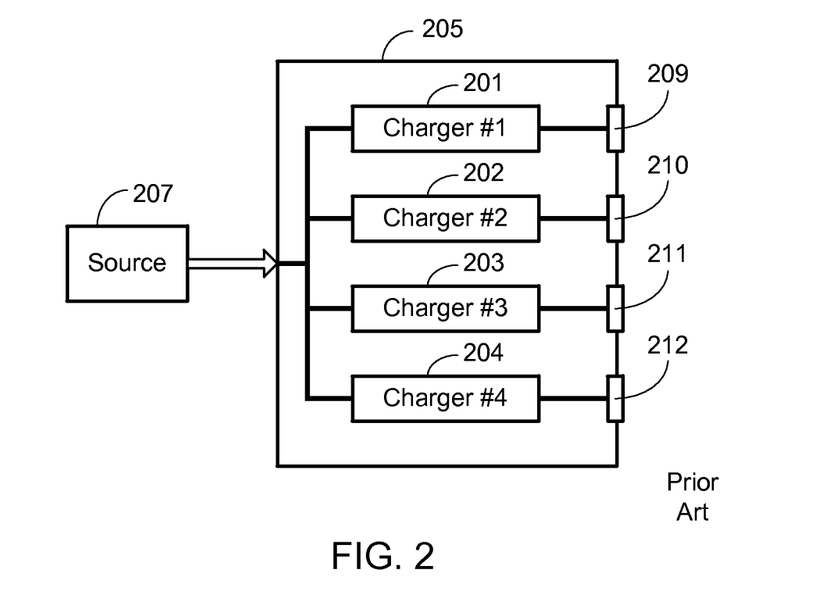
FIG. 2 provides an illustration of a multiport charging system in accordance with the prior art.

Central localization of charging stations within a parking lot or structure as illustrated in FIG. 1 provides physical access to a single charging source by multiple vehicles, significantly increasing accessibility and therefore user convenience. Further improvement may be gained if each charging system 101-103 includes multiple ports, thus allowing simultaneous charging of multiple vehicles. As illustrated in FIG. 2, in a conventional multiport system simultaneous charging is accomplished by incorporating four charging circuits 201-204 within the single system 205. Charging circuits 201-204 are coupled to source 207 (e.g., power grid) and coupled to different vehicle ports 209-212, respectively. In a conventional multiport charging station, charging circuits 201-204 are independent of one another, i.e., the operation or power output of one charging circuit does not impact the operation or power output of the other charging circuits within charging station 205. While this approach may be used to significantly improve vehicle access to a charging source, it is a relatively inefficient and costly approach due to the duplication of charging circuits 201-204. Accordingly, what is needed is an efficient way of simultaneously charging multiple vehicles from a single charging station. The present invention provides such a charging system.

SUMMARY OF THE INVENTION

The present invention provides a battery charging station that includes a plurality of charge ports, a plurality of power stages where each power stage includes an AC to DC converter and where each power stage provides a portion of the charging station's maximum available charging power, a switching system (for example comprised of a plurality of contactors or a plurality of semiconductor switches) that is used to couple the output of the power stages to the charging ports, a system monitor that determines current charging station and port conditions, and a controller that controls operation of the switching system in accordance with a predefined set of power distribution rules and in accordance with the current charging station and port conditions. Preferably the switching system and/or the controller prevent one charging port from being directly coupled to another charging port, thereby preventing the vehicle coupled to the first charging port from being connected to the vehicle coupled to the second charging port.

In one aspect of the invention, if the charging station has two charging ports, the controller will select a first portion of the power stages to couple to the first port and a second portion of the power stages to simultaneously couple to the second port in accordance with the predefined set of power distribution rules and the current charging station and vehicle conditions, where the first and second portions represent different power stages of the plurality of power stages; alternately, if the charging station has three charging ports, the controller will select a first portion of the power stages to couple to the first port, a second portion of the power stages to simultaneously couple to the second port, and a third portion of the power stages to simultaneously couple to the third port in accordance with the predefined set of power distribution rules and the current charging station and vehicle conditions, where the first, second, and third portions represent different power stages of the plurality of power stages; alternately, if the charging station has four charging ports, the controller will select a first portion of the power stages to couple to the first port, a second portion of the power stages to simultaneously couple to the second port, a third portion of the power stages to simultaneously couple to the third port, and a fourth portion of the power stages to simultaneously couple to the fourth port in accordance with the predefined set of power distribution rules and the current charging station and vehicle conditions, where the first, second, third, and fourth portions represent different power stages of the plurality of power stages.

In another aspect of the invention, the plurality of power stages are grouped together to form a plurality of power blocks, where each power block is comprised of three power stages, and where the switching system may couple between zero power blocks and all of the power blocks to any charging port.

The system monitor may monitor (i) vehicle arrival time for each charging port, where the predefined set of power distribution rules awards power distribution priority on the basis of monitored arrival time; (ii) charger usage fees paid for coupling a vehicle to a charging port, where the predefined set of power distribution rules awards power distribution priority on the basis of charger usage fees; (iii) vehicle priority information, where the predefined set of power distribution rules awards power distribution priority on the basis of vehicle priority information; (iv) customer priority information, where the predefined set of power distribution rules awards power distribution priority on the basis of customer priority information; (v) battery pack SOC for each vehicle coupled to a charging port, where the predefined set of power distribution rules awards power distribution priority on the basis of battery pack SOC; and (vi) intended departure time for each vehicle coupled to a charging port, where the predefined set of power distribution rules awards power distribution priority on the basis of the intended departure time. The predefined set of power distribution rules may award power distribution priority on the basis of a combination of monitored information, e.g., arrival time and vehicle priority information. The predefined set of power distribution rules may base power distribution on maximizing charger output. The charging station may include a keypad (e.g., a physical keypad and/or a touch-screen keypad) that may be used, for example, to enter priority information or intended departure time information. The charging station may accept charging port reservations and may include a display for displaying charging port reservation information.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries, typically contained within a single piece or multi-piece housing, the individual batteries electrically interconnected to achieve the desired voltage and capacity for a particular application. The terms "battery" and "battery system" may be used interchangeably and as used herein refer to an electrical energy storage system that has the capability to be charged and discharged such as a battery, battery pack, capacitor or supercapacitor. The term "electric vehicle" as used herein refers to either an all-electric vehicle, also referred to as an EV, a plug-in hybrid vehicle, also referred to as a PHEV, or a hybrid vehicle (HEV), where hybrid vehicles utilize multiple propulsion sources one of which is an electric drive system. It should be understood that identical element symbols used on multiple figures refer to the same component, or components of equal functionality. Additionally, the accompanying figures are only meant to illustrate, not limit, the scope of the invention and should not be considered to be to scale.

Embodiments of the present invention are applicable to systems that employ electric motors in general, and more specifically, but not exclusively, to electric vehicles using multiphase electric motors (e.g., induction motors). Electric vehicles use one or more sources of stored energy, e.g., a battery pack, to provide electrical energy to the vehicle. This energy is used, at least in part, to propel the vehicle. The stored energy may also be used to provide the energy required by other vehicle systems, for example vehicle lighting, the passenger compartment heating, ventilation and air conditioning (HVAC) system, auxiliary control systems (e.g., sensors, displays, navigation system, etc.), vehicle entertainment systems (e.g., radio, DVD, MP3, etc.), etc. Conventional electric vehicles include both passenger vehicles and vehicles designed to transport goods, examples of which include passenger automobiles, trucks, electric bikes and recreational watercraft. Electric vehicles also include specialized work vehicles and carts, some of which may incorporate equipment such as fork lifts, scissor lifts, elevating and/or articulating aerial work platforms, street-cleaning systems, conveyor belts, and flat carrier platforms.

Figure 3:
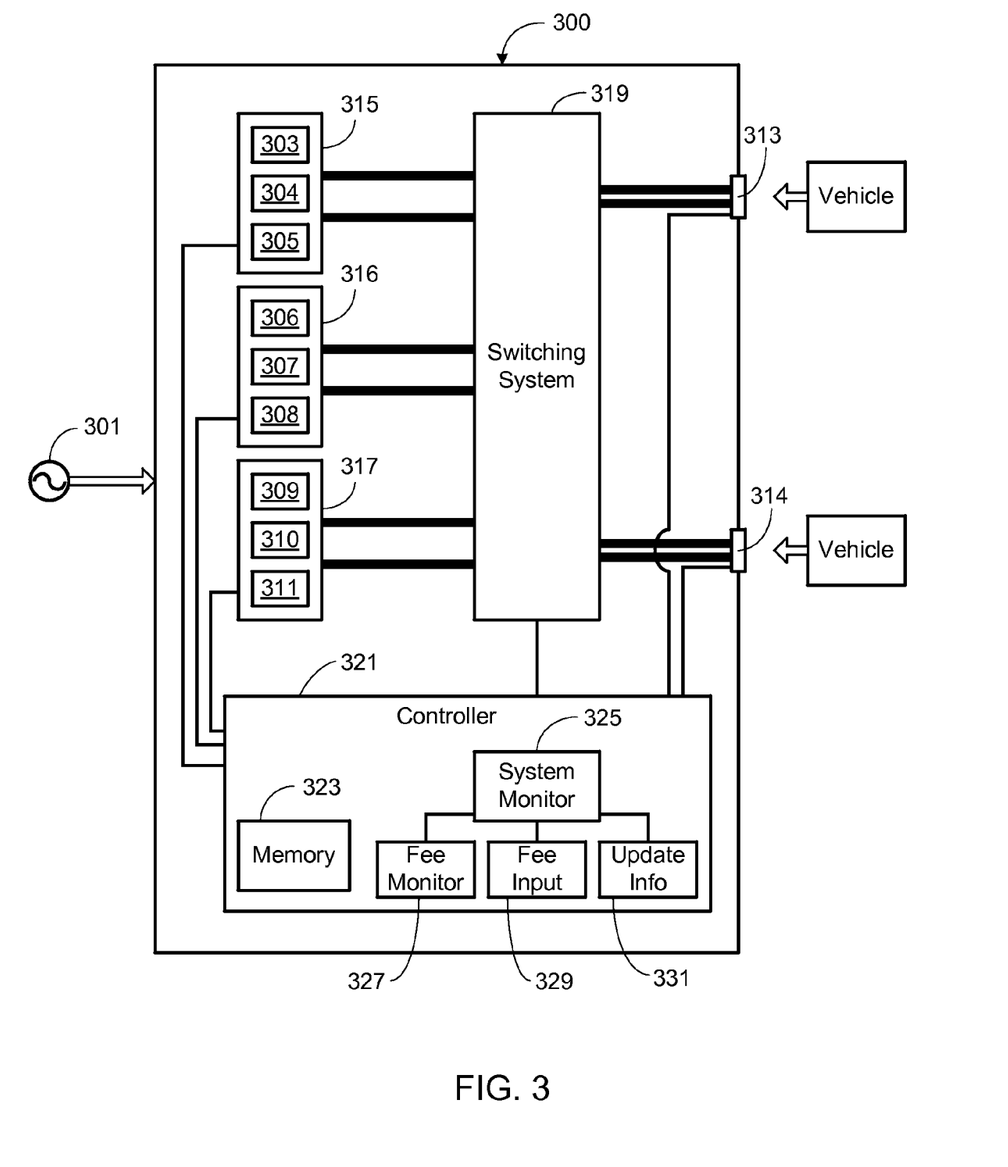
FIG. 3 illustrates a charger that includes nine parallel power stages and two charger ports.

FIG. 3 illustrates the basic elements of a charging system 300 in accordance with the invention. Charger 300, also referred to herein as a charging station, is coupled to an AC line voltage source 301, e.g., the power grid. Charger 300 includes a plurality of parallel power stages 303-311, each of which includes an AC to DC converter. It will be appreciated that charger 300 can include either a fewer number or a greater number of parallel power stages, this number depending upon the power available from source 301, the maximum desired charging power, the desired level of charging flexibility, and the number of charging ports. In the exemplary embodiment shown in FIG. 3, charger 300 includes a pair of charging ports 313/314, although a charger in accordance with the invention can use more than two charging ports, thus allowing the charger to simultaneously charge more than two vehicles.

In at least one preferred embodiment of the invention, and as shown in FIG. 3, the parallel power stages are grouped together into groups of three. Therefore in this embodiment power stages 303-305 are grouped together into power block 315; power stages 306-308 are grouped together into power block 316; and power stages 309-311 are grouped together into power block 317. Grouping into blocks of three helps to insure that the three phase AC side remains balanced. If imbalance is allowed, then the power stages need not be grouped together, thus allowing power distribution into smaller discrete power steps.

The output from each of the power blocks 315-317 is coupled to the charger ports 313/314 via switching system 319. Switching system 319 includes a plurality of contactors, or semiconductor switches, or other switching means, that allow the output from each of the power blocks to be electrically connected to either of the charger ports. Preferably switching system 319, or the control system that operates switching system 319, does not allow one charging port, e.g., port 313, to be coupled to another charging port, e.g., port 314. Using switching system 319, the amount of power that is coupled to a particular vehicle, via a charger port, may be tailored depending upon vehicle needs, charger port use, vehicle charging priority, fees, etc. A controller 321, coupled to switching system 319, determines the distribution of power from the power blocks to the charger ports by applying a predefined set of distribution rules recorded in memory 323. In at least one embodiment, controller 321 is a processor-based control system (e.g., microprocessor) and memory 323 is a flash memory, solid state disk drive, hard disk drive, or other memory type or combination of memory types. Also coupled to controller 321 is a system monitor 325 which continually monitors the charging system, including vehicle/port conditions. In particular, system monitor 325 continually monitors ports 313/314 in order to determine when a vehicle is coupled to the charging system. Preferably system monitor 325 also obtains vehicle information through the ports, although such information may also be provided via other means (e.g., wireless network, vehicle ID such as an RFID tag, etc.). Preferably the vehicle information obtained through these means will include vehicle battery capacity, current state-of-charge (SOC), desired SOC, charging capabilities of the battery, battery temperature, etc. Preferably system monitor 325 also is coupled to the power stages, or power blocks as shown, in order to obtain power output/capabilities of each stage and/or block, monitoring for changing output conditions or problems within a stage/block. In at least one embodiment, system monitor 325 also monitors the input line in order to detect line problems. System monitor 325 may also include, or be coupled to, subsystem 327 which determines charging fees. Charging fees may vary based on the time of day, the cost of the power provided by source 301, or based on other conditions. Preferably system monitor 325 also includes one or more subsystems 329 for accepting money from the end user and, in at least some cases, determining the amount of money input by the end user. For example, subsystem 329 may be capable of accepting cash from the end user and determining how much money was input. Subsystem 329 may also be capable of accepting credit cards or debit cards or other forms of non-cash payment. Preferably system monitor 325 also includes a subsystem 331 for updating distribution instructions or other aspects of charger 300. Subsystem 331 may include either a wireless or wired internet connection. Subsystem 331 may also utilize a different communication system/protocol for obtaining system updates.

In a charger with three power blocks as shown in FIG. 3, and assuming that each power block is configured to output the same amount of power, the power can be distributed at four different levels; 0 output, ⅓ $P_{max}$, ⅔ $P_{max}$, and $P_{max}$, where $P_{max}$ is equal to the maximum available power from charger 300, i.e., with all three power blocks coupled to a single port. As a result of this design, and as noted above, controller 321 can distribute the available power to the vehicles coupled to the charger's ports in a variety of different ratios depending upon the criteria used by the control system to determine power distribution.

Figure 4:
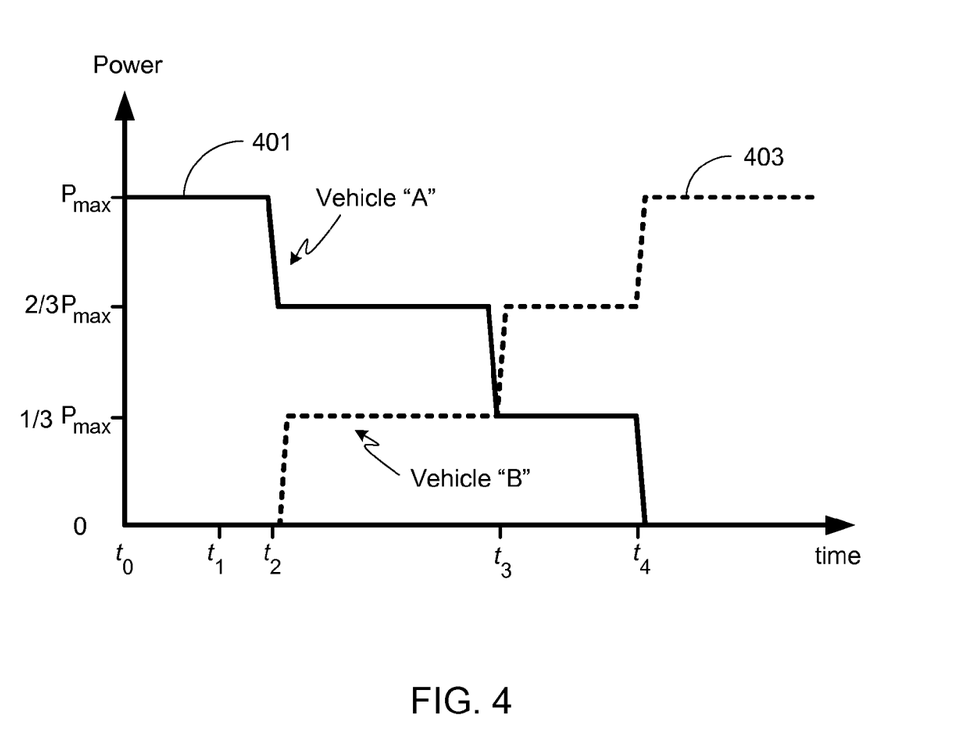
FIG. 4 graphically illustrates an exemplary use scenario for the charger shown in FIG. 3.

FIG. 4 graphically illustrates a possible use scenario of charger 300. This scenario is only meant to illustrate, not limit, how a charging system designed in accordance with the invention may be used to distribute power to two vehicles, "A" and "B". The charging power provided to vehicles A and B are represented by curves 401 and 403, respectively. In this example, it is assumed that initially, at time $t_0$, only vehicle A is coupled to charger 300, for example via charging port 313. As such, initially controller 321 couples the entire output, $P_{max}$, to port 313. This is shown by the first portion of curve 401. Then, at time $t_1$, vehicle B is coupled to charging port 314. In this example, from time $t_1$ to time $t_2$, vehicle B receives no charging power from port 314. This may be due to the priority given to vehicle A or for some other reason. At time $t_2$, the power available from charger 300 is split between vehicles A and B, with vehicle A dropping to ⅔ $P_{max}$ and vehicle B receiving ⅓ $P_{max}$. At time $t_3$, the split of power from charger 300 to vehicles A and B is reversed, with vehicle A now receiving ⅓ $P_{max}$ and vehicle B now receiving ⅔ $P_{max}$. This reversal may be due to vehicle A reducing its request for charging power. Alternately, and as discussed in detail below, controller 321 may be using some other criteria for altering the distribution of power from charger 300 to the two vehicles. At time $t_4$ all power, i.e., $P_{max}$, is sent to vehicle B. This may be due, for example, to vehicle A being decoupled from charger 300 as a result of the batteries within vehicle A being completely charged.

Figure 5:
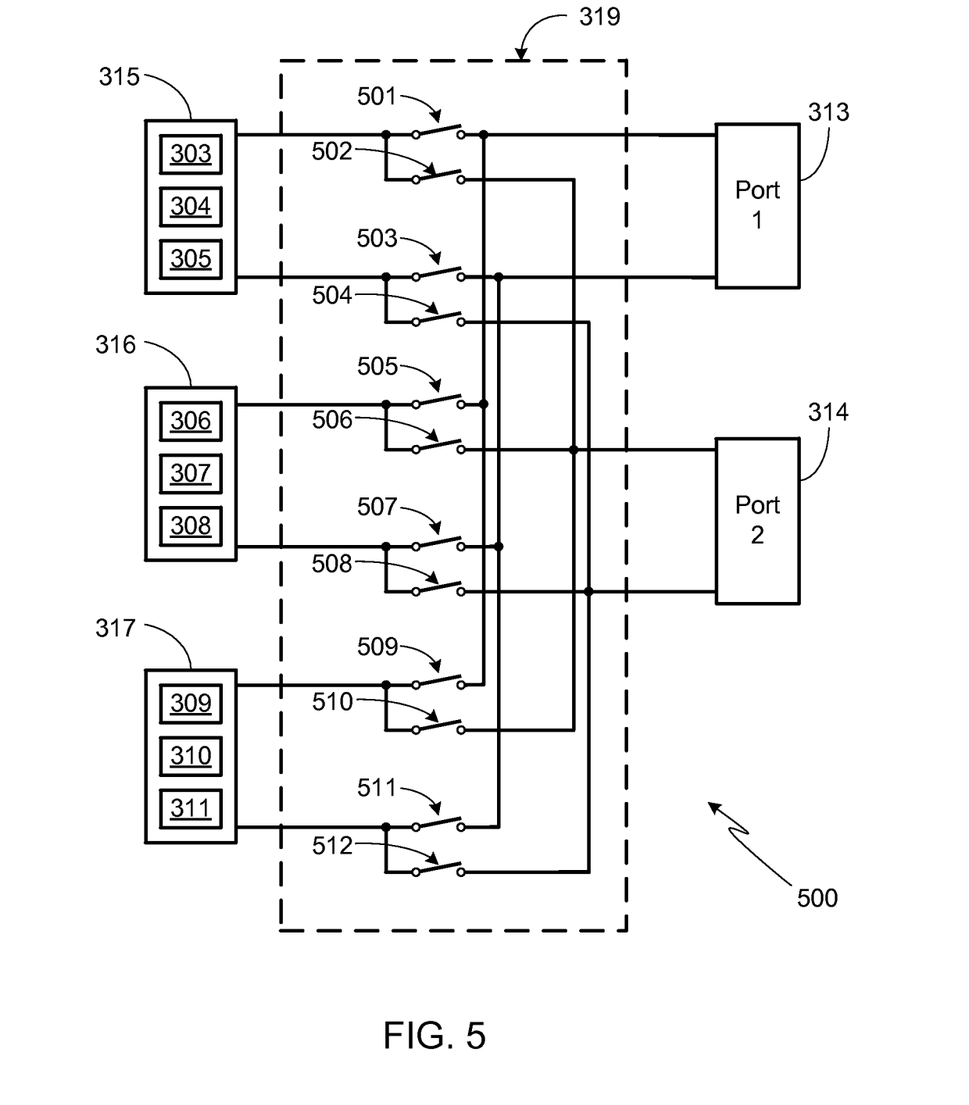
FIG. 5 illustrates a specific contactor configuration for use with a charger such as the charger shown in FIG. 3.
Figure 6:
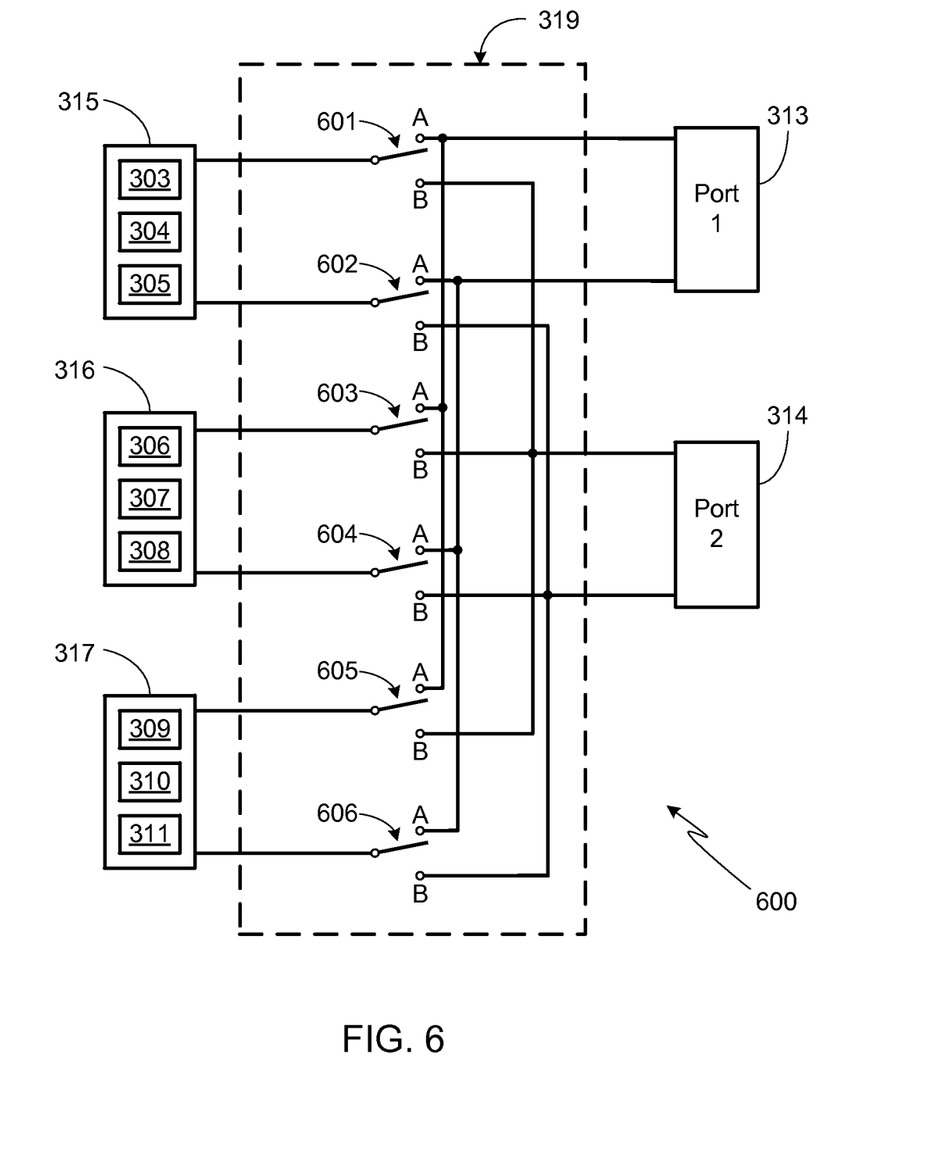
FIG. 6 illustrates an alternate contactor configuration.
Figure 7:
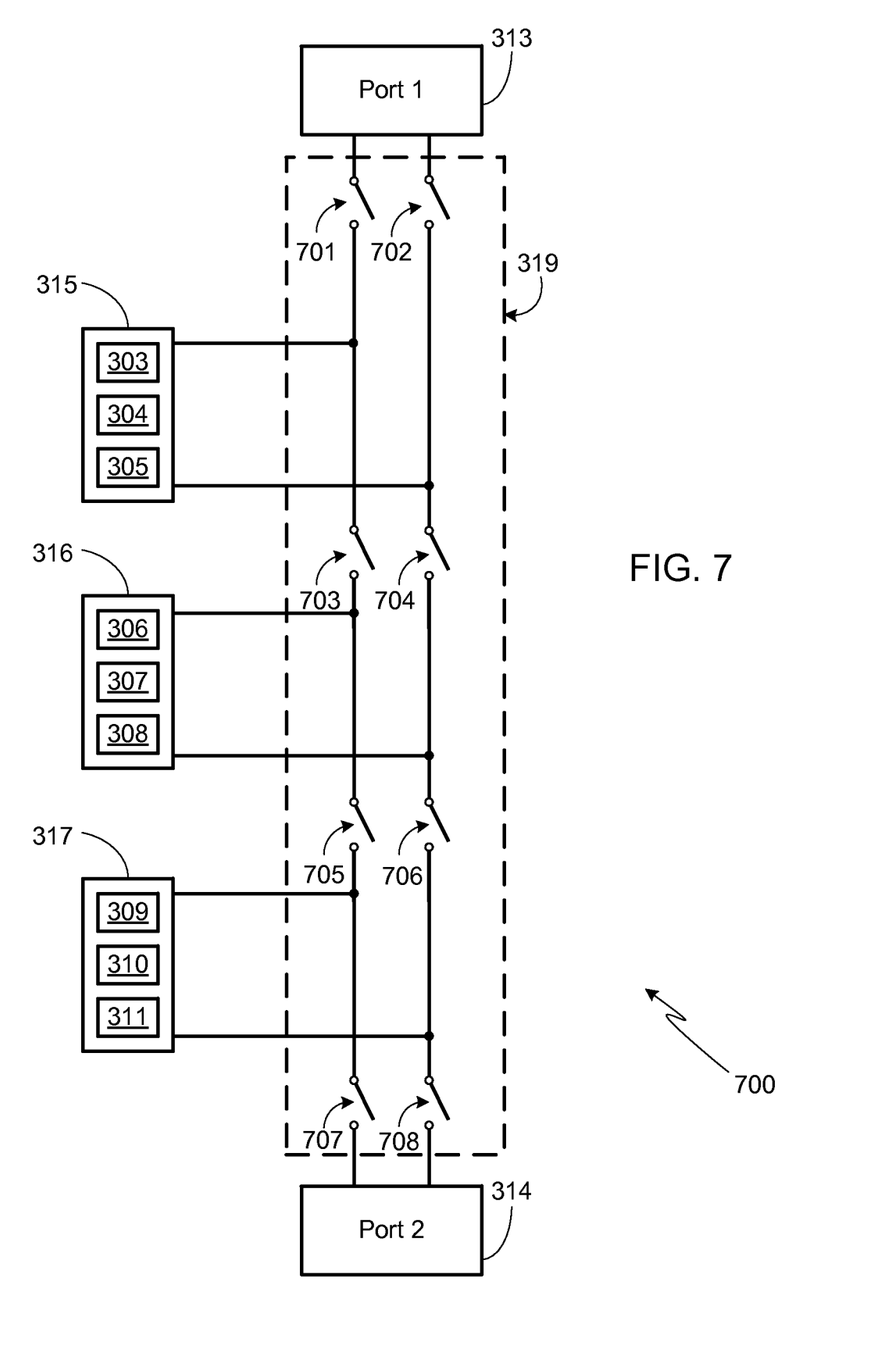
FIG. 7 illustrates yet another alternate contactor configuration.

FIGS. 5-7 illustrate three different configurations for the switching system 319 for use in a charger such as charger 300. As previously noted, the invention is not limited to only nine parallel power stages, nor is it limited to the use of only two ports. As such, systems 500-700 are only meant to illustrate some of the switching configurations that may be used to provide flexible distribution of charging power to the vehicle or vehicles coupled to the charger via ports 313/314.

In system 500 a plurality of contactors 501-512, or other switching means (e.g., semiconductor switches), are used to control the distribution of power from charging blocks 315-317 to ports 313/314. In use, controller 321 (not shown in this figure) determines which power blocks are to be coupled to which ports based on a preset, i.e., predefined, set of distribution instructions. As discussed below in detail, various distribution instructions, also referred to herein as distribution rules, are used to determine how much of the available power is to be provided to each of the charger's ports. It will be appreciated that the 12-contactor arrangement of system 500 can be used to provide any combination of output power to ports 313/314. For example, by closing contactors 501, 503, 506, 508, 510 and 512, power block 315 is coupled to port 313 (thus providing ⅓ $P_{max}$ to port 313) and power blocks 316 and 317 are coupled to port 314 (thus providing ⅔ $P_{max}$ to port 314).

In an alternate contactor configuration shown in system 600, each power block 315-317 uses a pair of three-position contactors (i.e., contactors 601-606) to determine whether power is coupled to port 313, port 314 or neither port. In system 600, to achieve the previously described power distribution (i.e., ⅓ $P_{max}$ to port 313 and ⅔ $P_{max}$ to port 314) requires that contactors 601/602 be coupled to port 313 (i.e., by contacting the 'A' contacts) and contactors 603-606 be coupled to port 314 (i.e., by contacting the 'B' contacts).

In an alternate contactor configuration shown in system 700, power blocks 315-317 are controllably coupled to ports 313/314 using eight contactors 701-708. While this approach provides a simple switching system, it does not lend itself to a charger with more than two ports. To achieve the previously described power distribution (i.e., ⅓ $P_{max}$ to port 313 and ⅔ $P_{max}$ to port 314) requires that contactors 701, 702 and 705-708 be closed while contactors 703/704 remain open.

Figure 8:
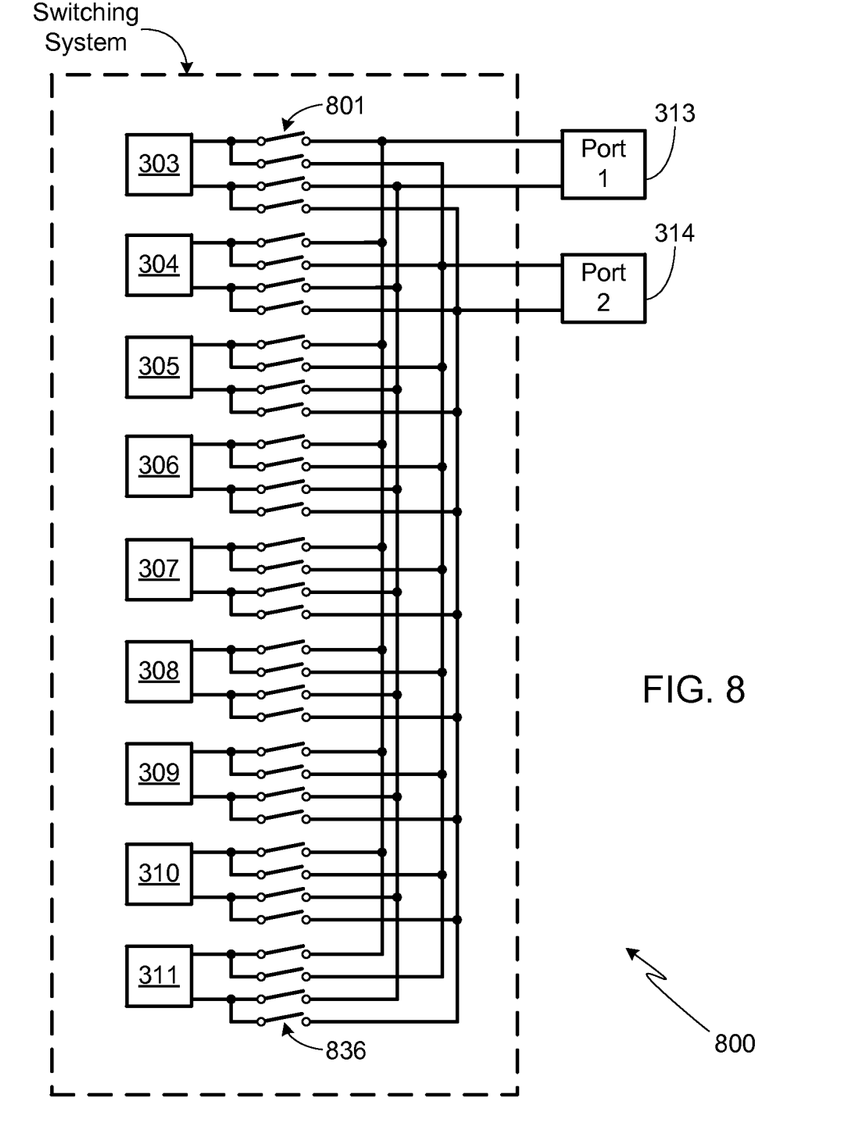
FIG. 8 illustrates yet another alternate contactor configuration.

As previously noted, while stacking the power stages into groups of three is preferred so that the three phase AC side remains balanced, if balancing is not required the invention is equally applicable to a non-stacked configuration. While any of the switching systems may be configured with non-stacked power stages, this approach is illustrated in FIG. 8 by modifying the configuration shown in system 500. In system 800, as opposed to each block using two pair of two position contactors, each power stage uses two pair of two position contactors. As a consequence, for the same number of power stages and the same dual port arrangement, the number of contactors is increased from the 12 contactors shown in system 500, i.e., contactors 501-512, to the 36 contactors shown in system 800, i.e., contactors 801-836 (note that while all 36 contactors are shown in FIG. 8, in order to make the figure more readable only contactors 801 and 836 are labeled). Therefore while the approach illustrated by system 800 provides greater power distribution flexibility, the inventors have found that this additional flexibility is typically not worth the additional switching complexity and associated costs.

Figure 9:
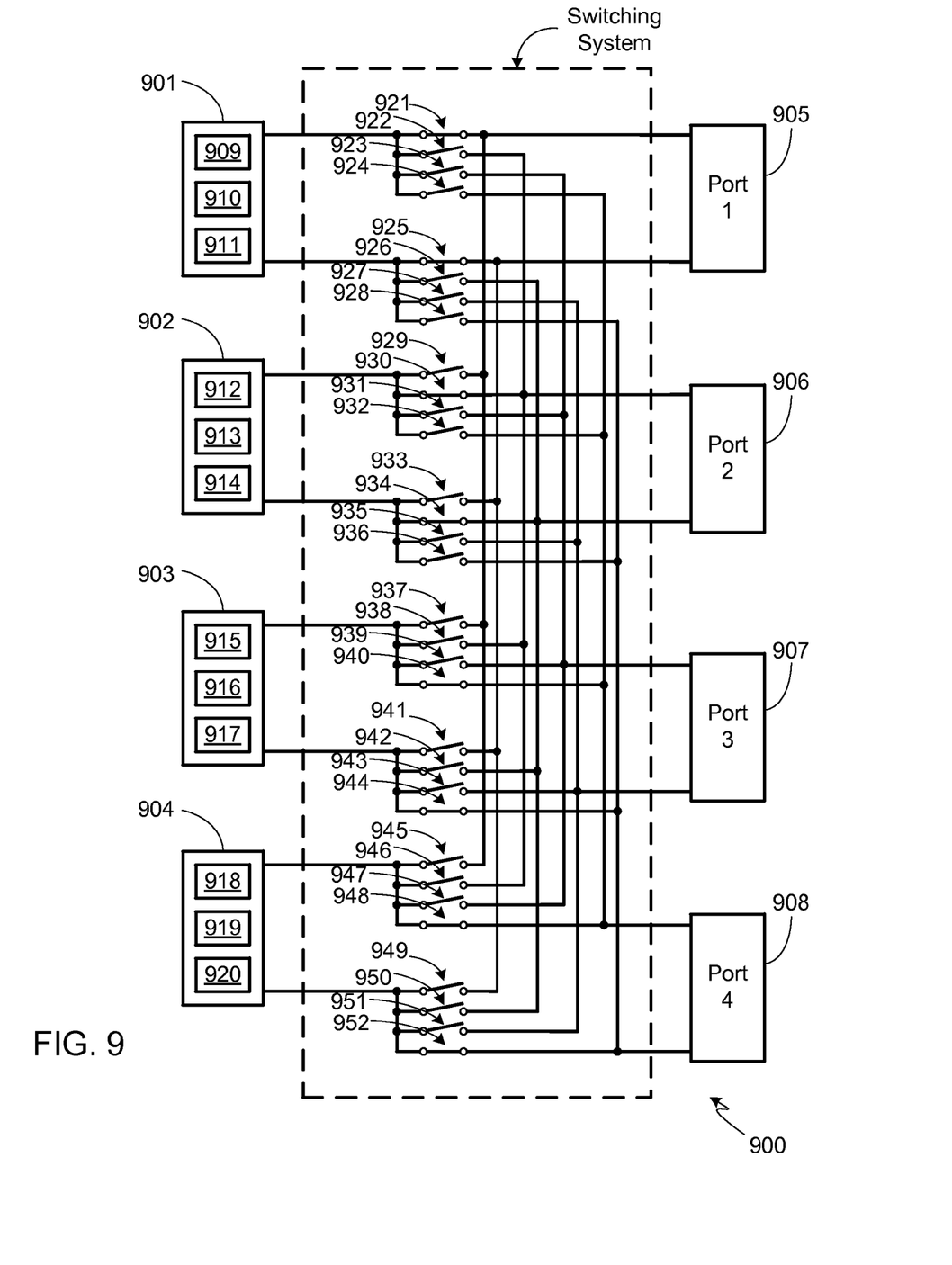
FIG. 9 illustrates the contactor configuration shown in FIG. 5 expanded to include additional power stages and additional ports, wherein the contactors are open/closed to illustrate an exemplary use configuration.

While the invention has been illustrated using only three power blocks and two vehicle ports, the present invention is easily expanded both in terms of power blocks and vehicle ports. For example, system 900 shown in FIG. 9 is based on the basic configuration shown in FIG. 5, modified to include 4 power blocks 901-904 and four ports 905-908. As shown, preferably each power block 901-904 is comprised of three power stages, i.e., stages 909-920, both to achieve balance on the three phase AC side as well as to provide the desired power levels with minimal switching system complexity. Note that in the illustrated embodiment, contactors 921 and 925 are shown closed in order to provide ¼ $P_{max}$ to port 905; contactors 930 and 934 are shown closed in order to provide ¼ $P_{max}$ to port 906; and contactors 940, 944, 948 and 952 are shown closed in order to provide ½ $P_{max}$ to port 908. As shown, no power is currently coupled to port 907.

Figure 10:
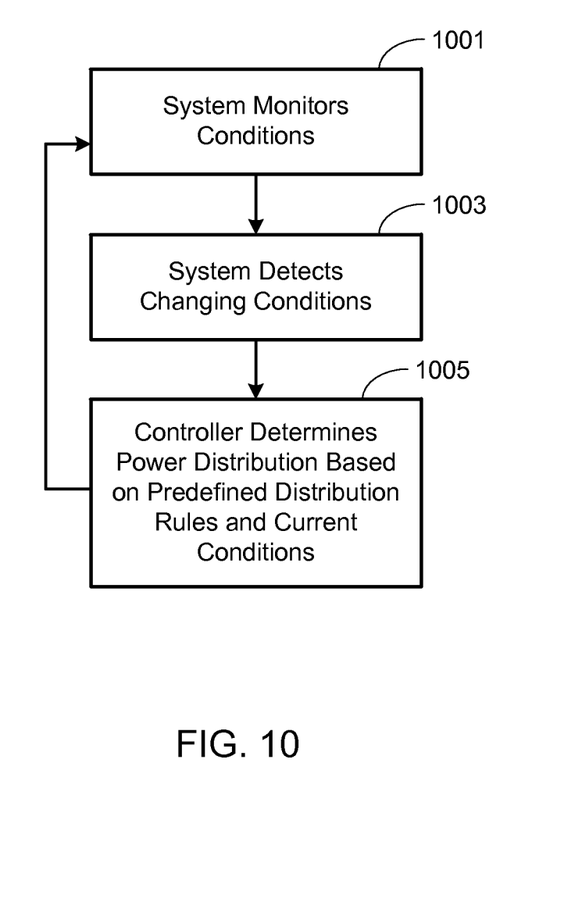
FIG. 10 illustrates the basic methodology used in distributing power to the various charging ports of a battery charging station of the invention.

The controller coupled to the switching system may use a variety of criteria in determining how to distribute the power available from the power blocks, or power stages, to the vehicles coupled to the charger's ports. FIG. 10 illustrates the basic methodology applied by the controller (e.g., controller 321) in distributing power to the various ports. In general, the charger controller continually monitors the system (e.g., charging system, charging ports and/or the vehicles attached to the charging ports) in order to detect changes that affect the charger (step 1001). Whenever the system detects a change that may affect the distribution of power (step 1003), then the controller determines the appropriate distribution of power (step 1005) based on the predefined set of distribution instructions and the current monitored conditions. Common changes that affect power distribution include, but are not limited to, coupling or decoupling a vehicle to the charger via one of the charger ports or changing the charging requirements to be applied to one or more of the vehicles coupled to the charger. Examples of less common changes that may affect power distribution include (i) the passage of time, for example where the distribution instructions include time requirements; (ii) a change in the status of one of the vehicles to be charged, for example where the fees paid at the beginning of the charging cycle have run out; and/or (iii) an undesirable change in battery temperature or other vehicle condition.

It will be appreciated that the charging system of the invention may be configured, via the predefined distribution instructions, to distribute the power to the various vehicles coupled to the charging system based on a variety of conditions and that the present invention is not limited to the exemplary distribution instructions described below. Exemplary power distribution instructions that may be used by the controller of the invention to distribute the power from the power stages/power blocks of the charger to the vehicles attached to the charger include:

Arrival Time Priority: In a charger in which power distribution is based on arrival time, the system monitors the arrival time of each vehicle that couples to the charger via one of its ports and awards priority on the basis of the monitored arrival time. Priority vehicles are provided with the maximum amount of available power, only limited by the needs of the vehicle's batteries. Thus, for example, in a multi-port charger designed and operating in accordance with this embodiment of the invention, the first vehicle that couples to the charger is given the maximum available power. Assuming that the first vehicle requires the maximum available power, vehicles that couple to the charger after the first vehicle would receive no charging power. Then, as the needs of the first vehicle taper off and power becomes available, the second vehicle that coupled to the charger is provided with the remaining power. When the first vehicle's batteries are fully charged, or charged to a preset SOC, the maximum available power is supplied to the second vehicle, assuming that the second vehicle can use the maximum available power. This process of providing maximum useful power to the priority vehicle, where priority is based on arrival time at the charger, continues to each vehicle coupled to the charger. As a consequence of this approach, the first vehicle to couple to the charger is the first vehicle to be charged, the second vehicle to couple to the charger is the second vehicle to be charged, etc.

Fee Based Priority: In an alternate embodiment, priority is given based on the fees paid by the end user, i.e., charger usage fees, thus allowing users to obtain charging priority by paying more for the use of the charger. In one scenario, the charger accepts a one-time priority fee per charging session from users regardless of how much power the user's vehicle requires. In an alternate scenario, priority customers pay a higher fee per kilowatt of power (or other measure) used during charging. It will be appreciated that a fee based priority system may apply a simple two-tier cost fee structure or utilize a multi-tier cost fee structure, the latter being more appropriate for chargers that include more than two charge ports. Typically a charger that uses a fee based priority scheme to distribute charging power uses another priority scheme, for example an arrival time based priority scheme as described above, that the user is able to circumvent by paying a priority fee. In effect this approach allows a user to leap-frog other users by paying more. Note that if two or more users pay the priority fee, assuming that they pay the same priority fee, then preferably the charging system relies on the base priority scheme. Thus, for example, in a charger with three or more ports, if the base priority scheme is an arrival time based priority scheme and the first vehicle pays the base rate and the second and third vehicles to couple to the charger pay the same priority fee, then the second vehicle would be given priority over the third vehicle even though they paid the same priority fee. Clearly modifications and variations of this approach are envisioned by the inventors.

Priority Customers: In an alternate embodiment, certain vehicles are automatically given priority over other vehicles. For example, priority may be based on a particular vehicle make (i.e., manufacturer) or model. Alternately, priority may be given to charger customers that belong to a particular club or association, e.g., American Automobile Association, aka AAA. Alternately, priority may be given for a customer that pays using a certain form of payment (e.g., cash versus credit) or a particular credit card (e.g., VISA® versus MasterCard®). Alternately, priority may be given to customers that are affiliated with a particular company or organization, e.g., company cars for the same company that owns and/or operates the charging station. Clearly these are only examples and the inventors envision that vehicle and/or customer priority may be based on other criteria. The priority information may be entered by the user when they couple their car to the charger, for example using a keypad coupled to the charger, or using other means of identification such as an RFID (or other wireless identification system) associated with either the user or the vehicle. It will be appreciated that in this scenario a base priority scheme, for example an arrival time based priority scheme as described above, is used to distribute power unless one or more of the vehicles coupled to the charger have priority status in accordance with this embodiment, in which case the priority customer and/or vehicle is allowed to leap-frog other users. As in the prior embodiment, if two or more users are deemed priority users, or are deemed to have equivalent priority, then distribution of charger power to the priority users/vehicles is established using the base distribution scheme.

Reservations: In an alternate embodiment, users are able to reserve a charger port, for example for a specific time and date on a specific charging station. Preferably the charger includes a display or other means that can be used to notify potential users that a port is not available. In at least one preferred embodiment, the controller deactivates the last remaining available port at, or before, the reserved time and displays a notification message, for example on a charging system display, that the last remaining port has been reserved. The notification display allows drive-up users to quickly determine that a port is unavailable for their use. Notifications of reserved ports may also be posted, for example on a web-page maintained by the charger station operator. Preferably users are able to reserve a port on a specific charger for a specific date and time using an internet web-based system. Typically interested parties first locate a charging station at the desired location, for example using a web-based charger location service, and then reserve a port using either a service (e.g., a web-based service) provided by the company operating the selected charger or a third party service provider.

Reservations with Power Profile: In a minor modification of the previously described reservation based priority system, the reserving party is also able to reserve a specific charging profile. For example, an end user may wish to reserve not only a charger port, but the ability to fast charge their vehicle. Alternately, the end user may wish to insure that a particular charging station is available, for example a station near their home, hotel, business, etc., but at that same time recognize that their vehicle will be at that location for an extended period of time, e.g., overnight. In this scenario the user only needs to reserve the charger port, but does not need to reserve the ability to charge at an accelerated rate.

Power Distribution Based on Vehicle Need: In an alternate embodiment, the charger controller determines the needs for each vehicle when the vehicle couples to the charging station, for example by ascertaining both the SOC and the charge capacity of the vehicle. The temperature of each vehicle's battery pack may also be used in determining power distribution. Preferably the information is provided to the charger controller by the coupled vehicles using an agreed upon communication protocol. Using this information, the controller distributes power to the vehicles coupled to the charger, for example distributing the available charging power based on need, or based on bringing all coupled vehicles to a predetermined minimum SOC level as quickly as possible, or based on bringing all coupled vehicles to an SOC level that represents a predetermined percentage of that vehicle's total battery capacity.

Power Distribution Based on User Need: In an alternate embodiment, when a user couples their vehicle to the charging system they input information into the controller that may be used in determining the optimal distribution of power. For example, the user may enter their intended departure time, thereby allowing the controller to determine how much time is available for battery charging for that particular vehicle. When vehicles are coupled to the charger that have different departure times, e.g., one vehicle may have two hours to charge while another vehicle may have twelve hours to charge, the controller is able to optimize the use of the available power. Preferably if no information is entered or otherwise gathered that may be used by the charger controller to optimize power distribution, the system relies on a default set of data.

Power Distribution Based on Maximizing Charger Output: In an alternate embodiment, instead of giving priority to a particular vehicle or customer, for example based on arrival time, fees, vehicle priority, etc., the controller maximizes charger output. Vehicle priority is only taken as a secondary consideration. For example, assuming a charging system with three power blocks as illustrated in FIGS. 3 and 5-7 and in which each block has an output of 30 kW, and assuming the vehicles coupled to ports 313 and 314 request 35 kW and 50 kW, respectfully, and that the vehicle coupled to port 313 has a higher priority than the other vehicle (e.g., due to arrival time or for some other reason), if the charging system is operating under this mode the controller would couple one power block to port 313 and two power blocks to ports 314, thus using 80 kW of the available 90 kW. Under an alternate configuration such as those previously described in which the power distribution is based on priority rather than maximizing charger output, two power blocks would be coupled to the higher priority vehicle coupled to port 313 in order to supply this vehicle with the requested 35 kW. As a result, the alternate configuration would only use 65 kW of the available 90 kW. Note that under the presently described configuration, and as noted above, if the charger's maximized output is the same under several distribution schemes, then preferably a secondary consideration (such as arrival time priority) is used to determine the appropriate power distribution. For example, in the previous illustration if both vehicles required 35 kW, then the controller would couple two power blocks to the vehicle coupled to port 313 since this vehicle has a higher priority and reversing the distribution and coupling two power blocks to port 314 would not yield a higher charger output.

As previously noted, the charger controller of the present invention applies a predefined set of power distribution rules in order to determine how the charging power, available in discrete steps due to the use of power stages/blocks, is distributed among the vehicles coupled to the charger's charger ports. While various power distribution rules have been described which may be applied singly or in combination, it will be appreciated that the invention is not limited to a particular set of power distribution rules and those provided herein are meant to clarify, but not limit, the application of the invention. Additionally, it should be understood that the predefined set of power distribution rules may limit the charging power applied to a vehicle even if the vehicle is the only vehicle coupled to the multi-port charger of the invention. This outcome may arise, for example, if the distribution rules only provide maximum charging power when a priority fee is paid, or if the vehicle/user in question is a priority vehicle/user.

Systems and methods have been described in general terms as an aid to understanding details of the invention. Additionally, numerous specific details have been given in order to provide a thorough understanding of the embodiments of the invention. One skilled in the relevant art will recognize, however, that an embodiment of the invention may be practiced without one or more of the specific details, or with other apparatus, systems, assemblies, methods, components, materials, parts, and/or the like. In other instances, well-known structures, materials, and/or operations are not specifically shown or described in detail to avoid obscuring aspects of embodiments of the invention.

Accordingly, while the present invention has been described herein with reference to particular embodiments thereof, it will be appreciated that the invention may be embodied in other specific forms, for example to adapt to a particular situation or material or component, without departing from the spirit or essential characteristics thereof. Therefore the disclosures and descriptions herein are intended to be illustrative, but not limiting, of the scope of the invention which is set forth in the following claims.

What is claimed is:

1. A battery charging station, comprising:
    at least two charging ports, wherein a first port of said at least two charging ports is coupleable to a first vehicle and a second port of said at least two charging ports is coupleable to a second vehicle;
    a plurality of power stages, wherein each power stage of said plurality of power stages is comprised of an AC to DC converter, and wherein each power stage of said plurality of power stages provides a portion of a maximum available charging power of said battery charging station;
    a switching system, wherein said switching system may couple between zero power and said maximum available charging power to any port of said at least two charging ports by coupling between zero power stages and all of said plurality of power stages to any port of said at least two charging ports;
    a system monitor, wherein said system monitor determines current charging station and vehicle conditions, wherein said charging station and vehicle conditions vary over time; and
    a controller coupled to said switching system and to said system monitor, wherein said controller controls operation of said switching system in accordance with a predefined set of power distribution rules and in response to current charging station and vehicle conditions;
    wherein said plurality of power stages are grouped together to form a plurality of power blocks, wherein each power block is comprised of three power stages of said plurality of power stages, and wherein said switching system may couple between zero power blocks and all of said plurality of power blocks to any port of said at least two charging ports.

2. The battery charging station of claim 1, wherein said controller selects a first portion of said plurality of power stages to be coupled to said first port and a second portion of said plurality of power stages to be simultaneously coupled to said second port in accordance with said predefined set of power distribution rules and in response to said current charging station and vehicle conditions, wherein said first portion and said second portion represent different portions of said plurality of power stages.

3. A battery charging station, comprising:
    at least two charging ports, wherein a first port of said at least two charging ports is coupleable to a first vehicle and a second port of said at least two charging ports is coupleable to a second vehicle;
    a plurality of power stages, wherein each power stage of said plurality of power stages is comprised of an AC to DC converter, and wherein each power stage of said plurality of power stages provides a portion of a maximum available charging power of said battery charging station;
    a switching system, wherein said switching system may couple between zero power and said maximum available charging power to any port of said at least two charging ports by coupling between zero power stages and all of said plurality of power stages to any port of said at least two charging ports;
    a system monitor, wherein said system monitor determines current charging station and vehicle conditions, wherein said charging station and vehicle conditions vary over time; and
    a controller coupled to said switching system and to said system monitor, wherein said controller controls operation of said switching system in accordance with a predefined set of power distribution rules and in response to current charging station and vehicle conditions;
    wherein at least one of said switching system and said controller prevents a first charging port of said at least two charging ports from being directly coupled to a second charging port of said at least two charging ports.

4. The battery charging station of claim 3, wherein said at least two charging ports further comprises a third port coupleable to a third vehicle, wherein said controller selects a first portion of said plurality of power stages to be coupled to said first port, a second portion of said plurality of power stages to be simultaneously coupled to said second port, and a third portion of said plurality of power stages to be simultaneously coupled to said third port in accordance with said predefined set of power distribution rules and in response to said current charging station and vehicle conditions, wherein said first portion, said second portion, and said third portion represent different portions of said plurality of power stages.

5. The battery charging station of claim 3, wherein said at least two charging ports further comprises a third port coupleable to a third vehicle and a fourth port coupleable to a fourth vehicle, wherein said controller selects a first portion of said plurality of power stages to be coupled to said first port, a second portion of said plurality of power stages to be simultaneously coupled to said second port, a third portion of said plurality of power stages to be simultaneously coupled to said third port, and a fourth portion of said plurality of power stages to be simultaneously coupled to said fourth port in accordance with said predefined set of power distribution rules and in response to said current charging station and vehicle conditions, wherein said first portion, said second portion, said third portion, and said fourth portion represent different portions of said plurality of power stages.

6. The battery charging station of claim 3, wherein said switching system is comprised of a plurality of contactors.

7. The battery charging station of claim 3, wherein said switching system is comprised of a plurality of semiconductor switches.

8. The battery charging station of claim 3, wherein said system monitor monitors charger usage fees paid for coupling to each port of said at least two charging ports, and wherein said predefined set of power distribution rules awards power distribution priority on the basis of said charger usage fees.

9. The battery charging station of claim 8, wherein said system monitor monitors vehicle arrival time for each port of said at least two charging ports, and wherein said predefined set of power distribution rules awards power distribution priority on the basis of the monitored arrival time if said charger usage fees are equivalent.

10. The battery charging stations of claim 3, wherein said system monitor monitors battery pack state-of-charge (SOC) for each vehicle coupled to each port of said at least two charging ports, and wherein said predefined set of power distribution rules distributes power on the basis of said battery pack SOC.

11. The battery charging station of claim 3, wherein said predefined set of power distribution rules maximizes an output power of said battery charging station.

12. The battery charging station of claim 3, wherein said controller selects a first portion of said plurality of power stages to be coupled to said first port and a second portion of said plurality of power stages to be simultaneously coupled to said second port in accordance with said predefined set of power distribution rules and in response to said current charging station and vehicle conditions, wherein said first portion and said second portion represent different portions of said plurality of power stages.

13. A battery charging station, comprising:
at least two charging ports, wherein a first port of said at least two charging ports is coupleable to a first vehicle and a second port of said at least two charging ports is coupleable to a second vehicle;
a plurality of power stages, wherein each power stage of said plurality of power stages is comprised of an AC to DC converter, and wherein each power stage of said plurality of power stages provides a portion of a maximum available charging power of said battery charging station;
a switching system, wherein said switching system may couple between zero power and said maximum available charging power to any port of said at least two charging ports by coupling between zero power stages and all of said plurality of power stages to any port of said at least two charging ports;
a system monitor, wherein said system monitor determines current charging station and vehicle conditions, wherein said charging station and vehicle conditions vary over time; and
a controller coupled to said switching system and to said system monitor, wherein said controller controls operation of said switching system in accordance with a predefined set of power distribution rules and in response to current charging station and vehicle conditions;
wherein said system monitor monitors vehicle arrival time for each port of said at least two charging ports, and wherein said predefined set of power distribution rules awards power distribution priority on the basis of the monitored arrival time.

14. The battery charging station of claim 13, wherein said system monitor monitors for vehicle or customer priority information, and wherein said predefined set of power distribution rules awards power distribution priority on the basis of said vehicle or customer priority information; and
wherein said predefined set of power distribution rules awards power distribution priority on the basis of the monitored arrival time if no vehicle or customer priority information is detected.

15. The battery charging station of claim 14, further comprising a keypad mounted to said battery charging station, wherein said vehicle or customer priority information may be entered via said keypad.

16. The battery charging station of claim 14, wherein said system monitor monitors a wireless identification system for said vehicle or customer priority information.

17. The battery charging station of claim 13, wherein said predefined set of power distribution rules awards power distribution priority on the basis of the monitored arrival time if a charging priority is not determined on the basis of vehicle or customer priority information.

18. The battery charging station of claim 13, wherein said controller selects a first portion of said plurality of power stages to be coupled to said first port and a second portion of said plurality of power stages to be simultaneously coupled to said second port in accordance with said predefined set of power distribution rules and in response to said current charging station and vehicle conditions, wherein said first portion and said second portion represent different portions of said plurality of power stages.

19. A battery charging station, comprising:
at least two charging ports, wherein a first port of said at least two charging ports is coupleable to a first vehicle and a second port of said at least two charging ports is coupleable to a second vehicle;
a plurality of power stages, wherein each power stage of said plurality of power stages is comprised of an AC to DC converter, and wherein each power stage of said plurality of power stages provides a portion of a maximum available charging power of said battery charging station;
a switching system, wherein said switching system may couple between zero power and said maximum available charging power to any port of said at least two charging ports by coupling between zero power stages and all of said plurality of power stages to any port of said at least two charging ports;

a system monitor, wherein said system monitor determines current charging station and vehicle conditions, wherein said charging station and vehicle conditions vary over time; and a controller coupled to said switching system and to said system monitor, wherein said controller controls operation of said switching system in accordance with a predefined set of power distribution rules and in response to current charging station and vehicle conditions;

wherein said system monitor monitors intended departure time for each vehicle coupled to each port of said at least two charging ports, and wherein said predefined set of power distribution rules optimizes power distribution on the basis of said intended departure time.

20. The battery charging station of claim 19, further comprising a keypad mounted to said battery charging station, wherein said intended departure time may be entered via said keypad.

21. The battery charging station of claim 19, wherein said controller selects a first portion of said plurality of power stages to be coupled to said first port and a second portion of said plurality of power stages to be simultaneously coupled to said second port in accordance with said predefined set of power distribution rules and in response to said current charging station and vehicle conditions, wherein said first portion and said second portion represent different portions of said plurality of power stages.

22. A battery charging station, comprising:
at least two charging ports, wherein a first port of said at least two charging ports is coupleable to a first vehicle and a second port of said at least two charging ports is coupleable to a second vehicle;
a plurality of power stages, wherein each power stage of said plurality of power stages is comprised of an AC to DC converter, and wherein each power stage of said plurality of power stages provides a portion of a maximum available charging power of said battery charging station;
a switching system, wherein said switching system may couple between zero power and said maximum available charging power to any port of said at least two charging ports by coupling between zero power stages and all of said plurality of power stages to any port of said at least two charging ports;
a system monitor, wherein said system monitor determines current charging station and vehicle conditions, wherein said charging station and vehicle conditions vary over time; and
a controller coupled to said switching system and to said system monitor, wherein said controller controls operation of said switching system in accordance with a predefined set of power distribution rules and in response to current charging station and vehicle conditions;
said battery charging stations further comprising a display mounted to said battery charging station, wherein said system monitor monitors for charging port reservations, and wherein said controller displays information corresponding to said charging port reservations on said display.

23. The battery charging station of claim 22, wherein said controller selects a first portion of said plurality of power stages to be coupled to said first port and a second portion of said plurality of power stages to be simultaneously coupled to said second port in accordance with said predefined set of power distribution rules and in response to said current charging station and vehicle conditions, wherein said first portion and said second portion represent different portions of said plurality of power stages.

* * * * *